(12) United States Patent
Shi et al.

(10) Patent No.: US 6,190,764 B1
(45) Date of Patent: *Feb. 20, 2001

(54) INDUCTIVE WRITE HEAD FOR MAGNETIC DATA STORAGE MEDIA

(75) Inventors: Zhupei Shi, San Jose; Chun He; Syed Hossain, both of Fremont; Mark S. Miller, Danville, all of CA (US)

(73) Assignee: Read-Rite Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/199,252

(22) Filed: Nov. 23, 1998

(51) Int. Cl.$^7$ .................................................. G11B 5/265
(52) U.S. Cl. .................... 428/332; 360/119; 360/122; 360/123; 428/692; 428/697; 428/900
(58) Field of Search ................... 360/119, 122, 360/123; 428/692, 697, 900, 332

(56) References Cited

U.S. PATENT DOCUMENTS

| | | |
|---|---|---|
| 4,661,216 | 4/1987 | Anderson et al. . |
| 4,883,711 | 11/1989 | Shiroishi et al. . |
| 5,029,317 | 7/1991 | Kawai et al. . |
| 5,087,482 | 2/1992 | Kawai et al. . |
| 5,147,732 | 9/1992 | Shiroishi et al. . |
| 5,187,628 | 2/1993 | Kanai et al. . |
| 5,371,643 | 12/1994 | Yuito et al. . |
| 5,469,317 | 11/1995 | Nagata et al. . |
| 5,491,600 | 2/1996 | Chen et al. . |
| 5,514,477 | 5/1996 | Ohashi et al. . |
| 5,589,262 | 12/1996 | Kiuchi et al. . |
| 5,606,478 | 2/1997 | Chen et al. . |
| 5,726,838 | 3/1998 | Soeya et al. . |
| 5,729,409 | 3/1998 | Ohashi et al. . |
| 5,748,416 | 5/1998 | Tobise et al. . |

OTHER PUBLICATIONS

N. Heiman, et al., *J. Appl. Phys.*, 49, 5663 (1978).
J. L. Su, et al., *J. Apll. Phys.*, 63, 15 (1998).
N. Ishiwata et al., *J. Appl. Phys.*, 69, 5616 (1991).
T. K. Kim and M. Takahashi, *Appl. Phys. Lett.*, 20, 492 (1972).
K. Ikehara et al., *J. Magn. Soc. Jpn.*, 15, Suppl. S2, (1991).
R. Arai et al., *IEEE Trans. Mag.*, 28, 2115 (1992).
D.D. Awschalom, Appl. Phys. Rev. Lett., 55, 1128 (1985).
M. R. Freeman, R. R. Ruf, and R. J. Gambino, IEEE Trans. Mag., 27, 4840 (1991).

*Primary Examiner*—Bernard Pianalto
(74) *Attorney, Agent, or Firm*—Hickman Coleman & Hughes, LLP

(57) ABSTRACT

An inductive write head includes a first pole and a second pole that form a yoke having a write gap between the first pole and second pole. The second pole is formed of a particular $Co_{100-a-b}Zr_aCr_b$ compound. More specifically, the second pole is formed where "a" is in the range of about 2 atomic percent to about 18 atomic percent, and "b" is in the range of about 0.5 atomic percent to about 6 atomic percent. The magnetic write element also includes a conductive coil which lies between the first pole and the second pole. The inductive write head also includes a first yoke pedestal attached to the first pole, and a second yoke pedestal attached to the second pole, with the write gap formed therebetween. Further, the first yoke pedestal has a pedestal width that defines the write element trackwidth and that is smaller than the pedestal width of the second yoke pedestal.

18 Claims, 17 Drawing Sheets

|  | NiFe | CoFe/CoNiFe | CoZrTa | FeN |
|---|---|---|---|---|
| Bs (kG) | 15.5 | 17–20 | 13 | 18–20 |
| ρ (μΩ-cm) | 48 | 16–23 | 90 | 22–50 |
| $\lambda s$ | $20 \times 10^{-6}$ | | | |
| CORROSION RESISTANCE | GOOD | | POOR | |

FIG. 3
(PRIOR ART)

| | NiFe | CoFe/CoNiFe | CoZrTa | FeN | CoZrCr |
|---|---|---|---|---|---|
| Bs (kG) | 15.5 | 17–20 | 13 | 18–20 | 13.5 |
| $\rho$ ($\mu\Omega$-cm) | 48 | 16–23 | 90 | 22–50 | 90–95 |
| $\lambda s$ | $20 \times 10^{-6}$ | | | | $\sim 3 \times 10^{-6}$ |
| CORROSION RESISTANCE | GOOD | | POOR | | GOOD |

FIG. 6

INDUCTIVE WRITE HEAD FOR MAGNETIC DATA STORAGE MEDIA

BACKGROUND OF THE INVENTION

This invention relates generally to magnetic disk data storage systems, and more particularly to inductive write heads for magnetic data storage media.

Magnetic disk drives are used to store and retrieve data for digital electronic apparatus such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (which will be described in greater detail with reference to FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be read from the magnetic disk 16 as the actuator 18 causes the transducer 24 to pivot in a short arc as indicated by the arrows P. The design and manufacture of magnetic disk data storage systems is well known to those skilled in the art.

FIG. 1C depicts a magnetic read/write head 24 including a write element 26 and a read element 28. The edges of the write element 26 and read element 28 also define an air bearing surface ABS, in a plane 29, which faces the surface of the magnetic disk 16 shown in FIGS. 1A and 1B.

The read element 28 includes a first shield 36, an intermediate layer 31, which functions as a second shield, and a read sensor 40 that is located between the first shield 36 and the second shield 31 and suspended within a dielectric layer 37. The most common type of read sensor 40 used in the read/write head 30 is the magnetoresistive sensor which is used to detect magnetic field signals from a magnetic medium through changing resistance in the read sensor.

The write element 26 is typically an inductive write element. The intermediate layer 31 is shared between the read element 28 and the write element 26, forming a first pole of the write element 26. With a second pole 32, the first pole 31 forms a yoke 38. A write gap 30 is formed between the first pole 31 and the second pole 32. Specifically, the write gap 30 is located adjacent to a portion of the first pole and second pole which is sometimes referred to as the yoke tip region 33. The write gap 30 is filled with a non-magnetic material 39. Also included in write element 26, is a conductive coil 34 that is positioned within a dielectric medium 35. The conductive coil 34 of FIG. 1C is formed of a first coil C1 and a second coil C2. As is well known to those skilled in the art, these elements operate to magnetically write data on a magnetic medium such as a magnetic disk 16.

In FIG. 1D, a view taken along line 1D—1D of FIG. 1C (i.e., perpendicular to the plane 29 and therefore perpendicular to the air bearing surface ABS) further illustrates the structure of the write element 28. As can be seen from this perspective, a pole width W of the first pole 31 and second pole 32 in the yoke tip region 30 are substantially equal. A parameter of any write element is its trackwidth which affects its performance. In the configuration of FIG. 1D, the trackwidth is defined by the pole width W.

FIGS. 1E and 1F show two views of another prior art read/write head. The read element 28 of FIG. 1E is substantially the same as in the read/write head of FIG. 1C. However, above and attached to the first pole 31, is a first yoke pedestal Y1P in the yoke tip region 33, abutting the ABS. In addition, a second yoke pedestal Y2P is disposed above and aligned with the first yoke pedestal Y1P. Further, the second yoke pedestal Y2P is adjacent to the second pole 32. The write gap 30 is formed between the first and second yoke pedestals Y1P and Y2P.

The write element 26 of the prior art is shown in FIG. 1F as viewed along the line 1F—1F of FIG. 1E. Here it can be seen that the first and second yoke pedestals Y1P and Y2P have substantially equal pedestal widths Wp which are smaller than the pole width W of the first and second poles 31 and 32 in the yoke tip region 33. In this configuration, the trackwidth of the write element 28 is defined by the width Wp.

An inductive write head such as those shown in FIGS. 1C–1F operates by inducing a magnetic flux in the first and second pole. This can be accomplished by passing a writing current through the conductive coil 34. The write gap 30 allows the magnetic flux to fringe (thus forming a gap fringing field) and impinge upon a recording medium that is placed near the ABS. Thus, the strength of the gap field is a parameter of the write element performance. Other performance parameters include the non-linear transition shift (NLTS), which arises from interbit magnetostatic interactions that occur during the write process, and overwrite.

The amount of time that it takes the magnetic flux to be generated in the poles by the writing current (sometimes termed the "flux rise time") is a critical parameter also, especially for high-speed write elements. In particular, the smaller the flux rise time, the faster the write element can record data on a magnetic media (i.e., a higher data rate). The extended flux rise time is an indicator of eddy current losses and head saturation in the write element. Thus, high data rate applications with large linear bit density and large track density can be accommodated by a writer having a large gap field and low eddy current loss.

It has been found that the yoke length YL of the second pole 32 influences the flux rise time, as is shown by the curves in the graph of FIG. 2A. The corresponding impact of yoke length on data rate can be seen with reference to the curves of FIG. 2B. As can be seen in FIGS. 2A and 2B, the flux rise time, and therefore data rate, of a typical second pole of 35% FeNi can be improved with lamination. However, such lamination can increase the fabrication process complexity, for example increasing cycle time as well as cost of fabrication.

It has also been found that materials with higher electrical resistivity $\rho$ exhibit smaller flux rise times, which indicates that using such materials can reduce eddy current loss in a write clement. Other material properties desired in a write material include high saturation magnetic flux density Bs, low saturation magnetostriction $\lambda s$, and good corrosion resistance.

Materials that have been used to form the poles in write elements include NiFe, CoFe, CoNiFe, CoZrTa, and FeN. The saturation magnetic flux density, saturation magnetostriction $\lambda s$, and corrosion resistance of these materials are listed in the table of FIG. 3. Higher Fe concentration in NiFe alloy does enhance its saturation magnetic flux density Bs, but the magnetostriction $\lambda s$ of the resultant NiFe alloy increases rapidly. For example, $Ni_{45}Fe_{55}$, has Bs and $\lambda s$ values of 15.5 kGauss and $20\times10^{-6}$, respectively. In addition, the NiFe alloy family has low electrical resistivity which can inhibit high speed applications because of high eddy current losses. CoFe and CoNiFe also suffer from low electrical resistivity. Also, while Fe based nitride films and their derivatives can have high Bs values when the nitrogenized films are in crystallized bcc phase, they require film lamination to overcome their low electrical resistivity for high data rate applications. As an additional option, CoZrTa, having a relatively large electrical resistivity, can be used. However, CoZrTa exhibits poor corrosion resistance and is therefore less desirable for write element pole use. For example, the corrosion resistance of CoZrTa is exemplified in the graphs of FIGS. 4A and 4B which show Tafel plots using 0.01 M NaCl and $Na_2SO_4$ electrolytes, respectively.

Thus, what is desired is an improved write element design that can effectively operate at high speeds while significantly resisting corrosion. Further, such a write element that can write at high data densities is desired.

SUMMARY OF THE INVENTION

The present invention provides a write element and method for making the same that provides high write performance and significantly resists corrosion. Further, fabrication of the write element is inexpensive and entails low complexity. Specifically, a magnetic material formed of CoZrCr forms a second pole of a write element. Particular formulations of this material exhibit high resistivity which reduces eddy currents, thereby decreasing flux rise time and facilitating high speed data recording. More particularly, the write element can include a first pedestal and a second pedestal, the write element trackwidth being defined by the first pedestal width. This configuration facilitates high density recording. A write element having this configuration and incorporating the CoZrCr second pole provides high speed, high density magnetic data recording.

According to an embodiment of the present invention, a magnetic write element for use in high speed magnetic recording includes a first pole having a first pole tip, and a second pole having a second pole tip which defines a write gap with the first pole tip. The second pole is formed of a $Co_{100-a-b}Zr_aCr_b$ compound, where "a" is in the range of about 2 atomic percent to about 18 atomic percent, and "b" is in the range of about 0.5 atomic percent to about 6 atomic percent. The magnetic write element also includes a conductive coil which lies between the first pole and the second pole. The write element with such a $Co_{100-a-b}Zr_aCr_b$ compound results in a smaller flux rise time which supports high data rate and high density recording while minimizing corrosivity.

In another embodiment of the present invention, a magnetic device for high density magnetic recording includes a first pole having a first pole tip portion, and a first yoke pedestal, having a first width, connected to the first pole at the first pole tip portion. The magnetic device also includes a second pole, having a second pole tip portion, and a second yoke pedestal. The second pole is formed of a $Co_{100-a-b}Zr_aCr_b$ compound, where "a" is in the range of about 2 atomic percent to about 18 atomic percent, and "b" is in the range of about 0.5 atomic percent to about 6 atomic percent. The second yoke pedestal is connected to the second pole at the second pole tip portion and aligned with the first yoke pedestal, and has a second width that is larger than the first width. Also, a write gap is formed between the first yoke pedestal and the second yoke pedestal, while a conductive coil is positioned between the first pole and the second. The use of such a compound in a write element so configured provides good high density recording performance while minimizing corrosivity.

In yet another embodiment of the present invention, a method for forming a write element, including forming a first pole, forming a first insulation layer over the first pole, forming a conductive coil layer over the first insulation layer, and covering said conductive coil layer with non-magnetic and electrically insulating material. The method also includes forming a second pole, over the non-magnetic and electrically insulating material, of a CoZrCr compound having a stoichiometric composition of $Co_{100-a-b}Zr_aCr_b$, where "a" is in the range of about 2 atomic percent to about 18 atomic percent, and "b" is in the range of about 0.5 atomic percent to about 6 atomic percent. With such a method, a write element capable of high performance high density recording can be formed, which also exhibits low corrosivity.

These and other advantages of the present invention will become apparent to those skilled in the art upon a reading of the following descriptions of the invention and a study of the several figures of the drawing.

BRIEF DESCRIPTION OF THE DRAWINGS

The present invention will be readily understood by the following detailed description in conjunction with the accompanying drawings, wherein like reference numerals designate like elements.

FIG. 3 is a table of various material characteristics of materials used in second poles of the prior art;

FIG. 6 is a table of various material characteristics of CoZrCr used in a second pole according to an embodiment of the present invention, in comparison with such characteristics of the prior art;

DETAILED DESCRIPTION OF THE PREFERRED EMBODIMENTS

Figure 5A:
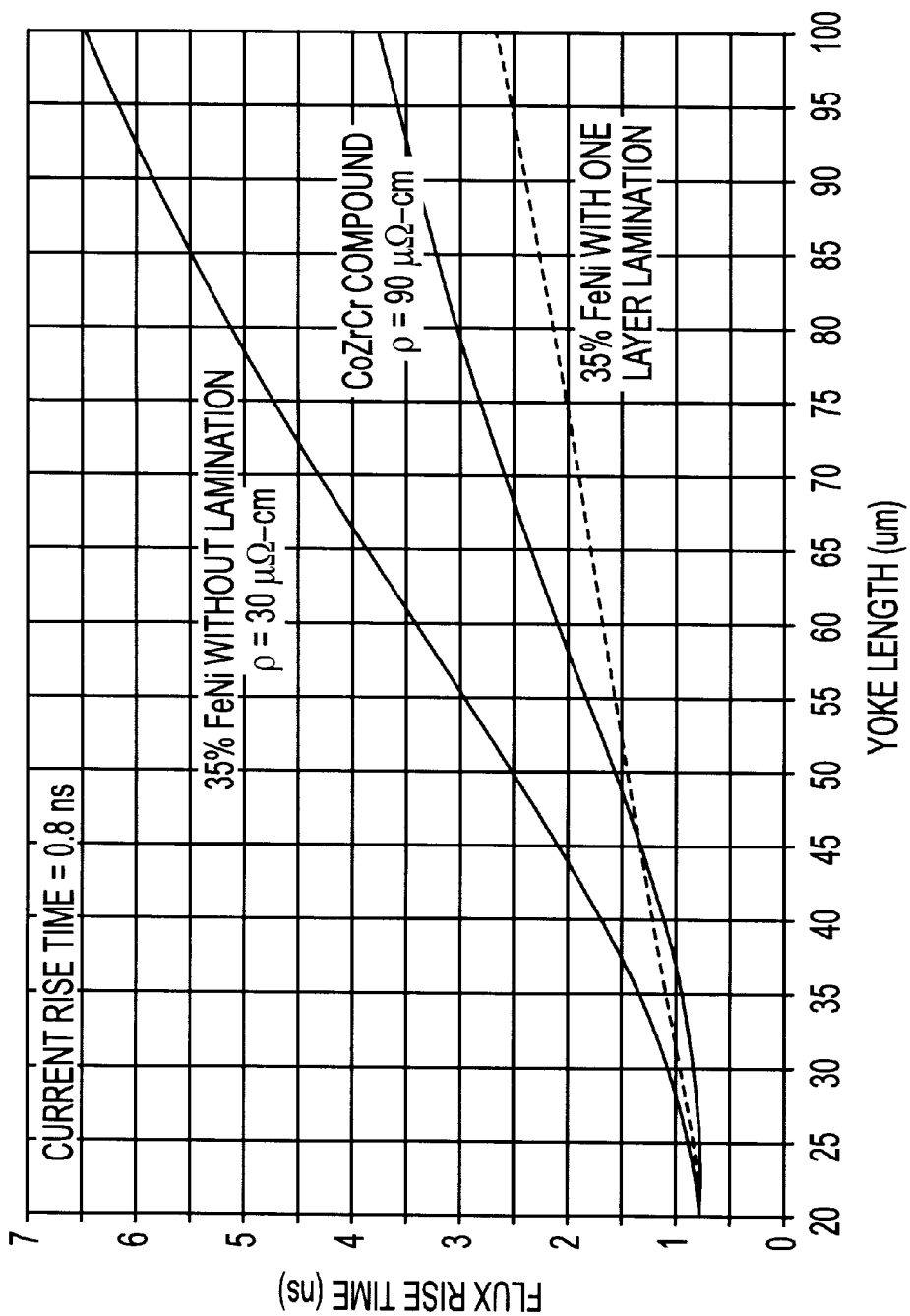
FIG. 5A is a graph of the variation of flux rise time with varying yoke length, exhibited by a write element in accordance with an embodiment of the present invention, in comparison with similar variations exhibited by prior art write elements.

FIGS. 1–4 were discussed with reference to the prior art. An embodiment of the present invention includes the use of a CoZrCr compound exhibiting high electrical resistivity ρ which results in high speed recording capabilities when used in write element poles. The effect of an electrical resistivity ρ on the order of 90 $\mu\Omega$-cm on flux rise time is shown in FIG. 5A for varying yoke length YL. As shown by the curves of FIG. 5A, the CoZrCr compound results in substantially shorter flux rise times than those with the 35% FeNi without lamination. In addition, the CoZrCr performance is better than or substantially similar to that with 35% FeNi with one layer lamination across a wide range of yoke lengths. The flux rise time responses are indicative of the data rate performance of the write element, as is demonstrated in FIG. 5B.

Figure 5B:
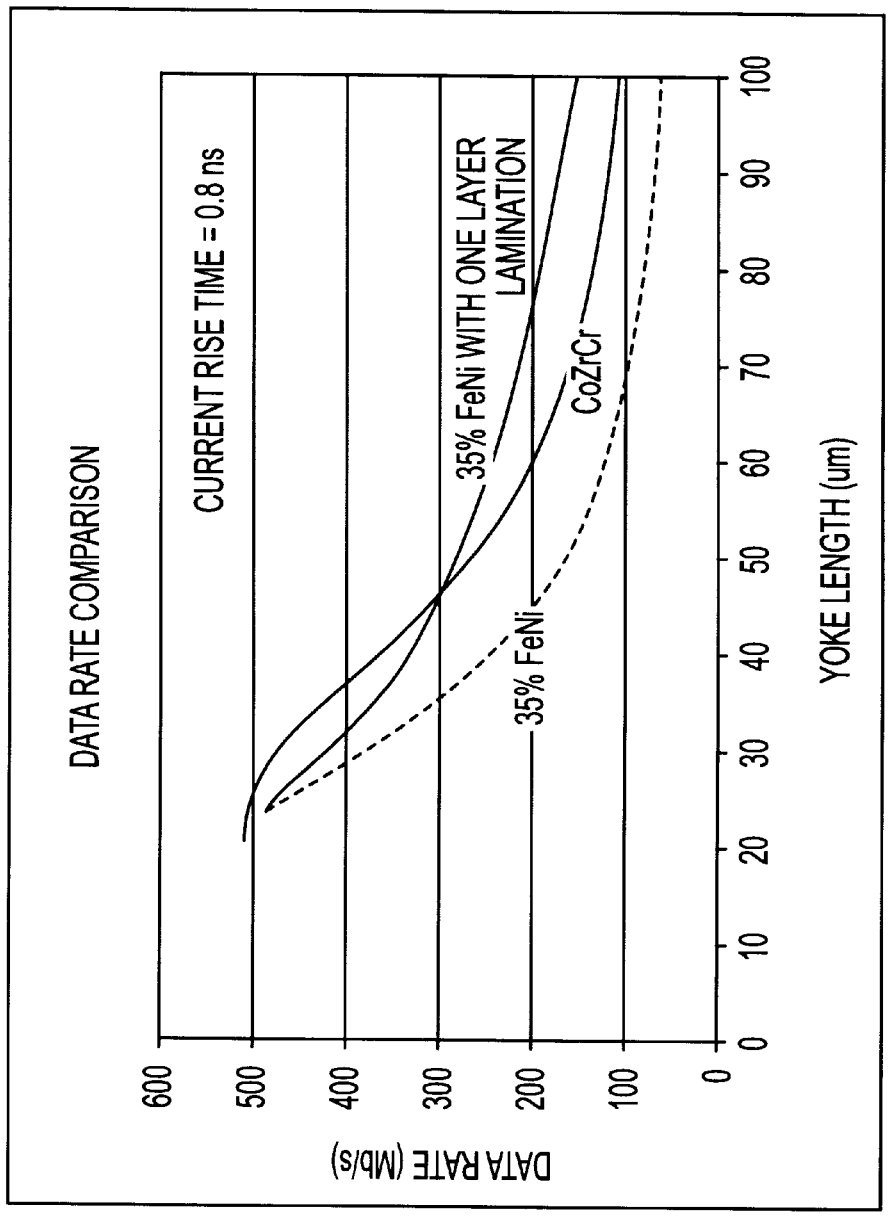
FIG. 5B is a graph of the variation of recorded data rate with varying yoke length exhibited by a write element in accordance with an embodiment of the present invention, in comparison with similar variations exhibited by prior art write elements.

FIG. 5B illustrates the data rate experienced with the CoZrCr compound, in comparison with 35% FeNi both with and without one layer lamination. Again, across substantially all yoke lengths, the CoZrCr compound produces higher data rates than the 35% FeNi without lamination. Also, the curves show the data rate of the CoZrCr compound as being substantially similar to or greater than that of the 35% FeNi with one layer lamination, for a wide range of yoke length. Because the performance of the CoZrCr compound relative to the laminated FeNi, and the inherent drawbacks of lamination, using the high resistivity CoZrCr is a more effective approach to improving flux rise time and data rate than implementing laminations in the yoke.

Figure 7A:
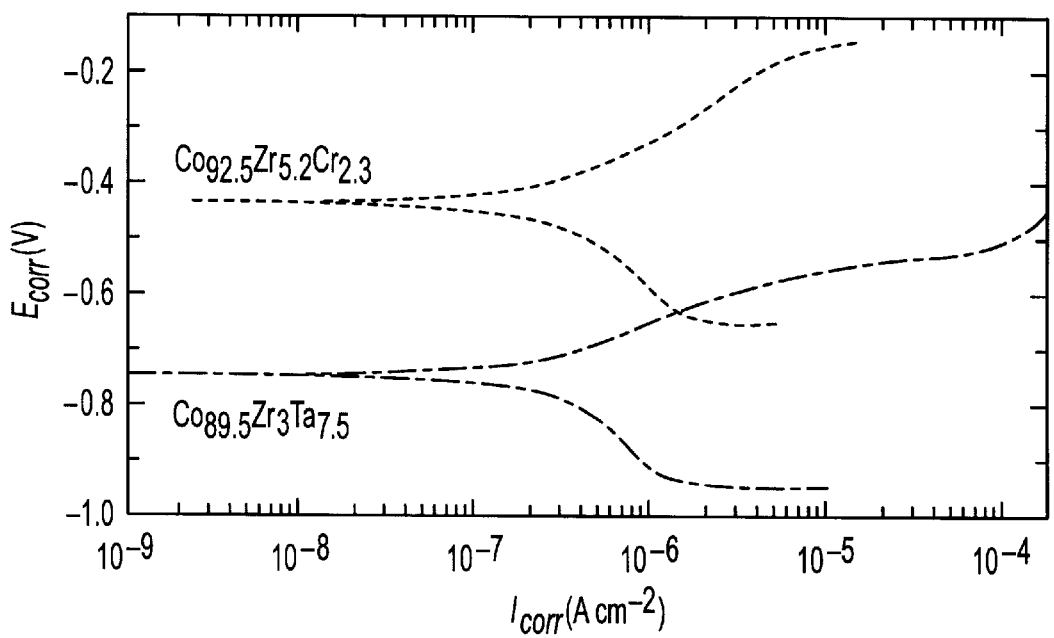
FIG. 7A is a graph illustrating the corrosion resistance of CoZrCr and CoZrTa in NaCl electrolyte.
Figure 7B:
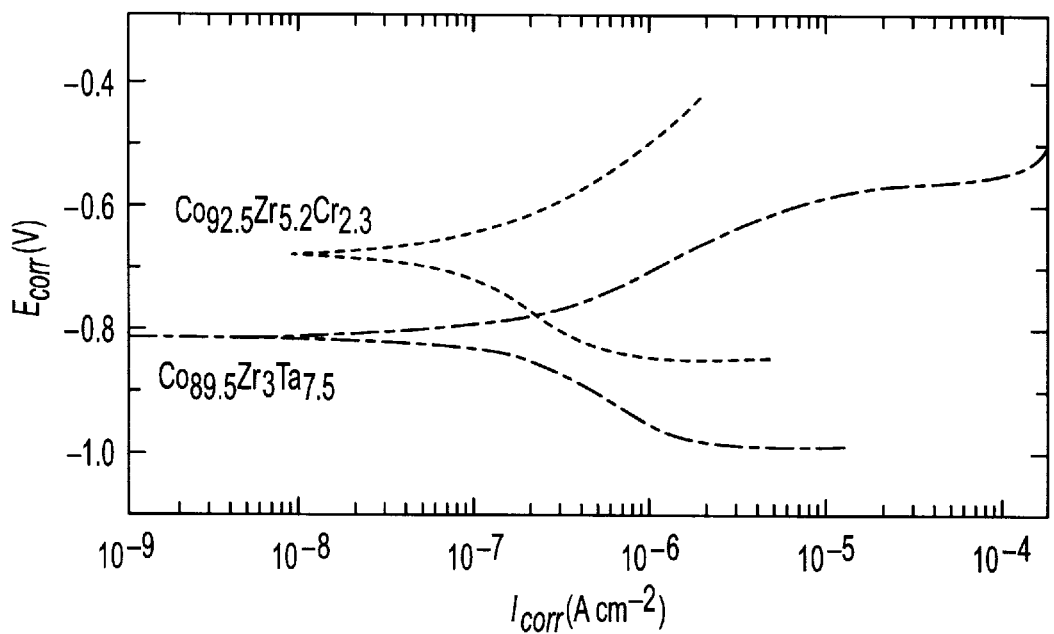
FIG. 7B is a graph illustrating the corrosion resistance of CoZrCr and CoZrTa in $Na_2SO_4$ electrolyte.

In addition to high electrical resistivity, the CoZrCr compound exhibits other characteristics that make it a particularly suitable material for use in the yoke of a write element. As shown in FIG. 6 and compared with other yoke materials, a $Co_{92.5}Zr_{5.2}Cr_{2.3}$ compound has a saturation field of about 13.5 kGauss, an electrical resistivity of about 90 to about 95, and a magnetostriction of about $3 \times 10^{-6}$. In addition, the $Co_{92.5}Zr_{5.2}Cr_{2.3}$ compound has a good resistance to corrosion. This resistance to corrosion can be seen in FIGS. 7A and 7B, in comparison with the behavior of a CoZrTa compound. Specifically, FIGS. 7A and 7B show Tafel plots for films of the two compounds using a NaCl electrolyte and a $Na_2SO_4$ electrolyte, respectively. As can be easily seen, the CoZrCr compound is significantly more corrosion resistant than is the CoZrTa compound tested.

In addition to the particular $Co_{92.5}Zr_{5.2}Cr_{2.3}$ compound, other stoichiometric compositions of CoZrCr can work well. For example, a composition of $Co_{100-a-b}Zr_aCr_b$, where "a" is in the range of about 2 to about 18 atomic percent and "b" is in the range of about 0.5 to about 6 atomic percent, can be satisfactory for high speed data recording. More specifically, "a" in the range of about 4 to about 9 atomic percent and "b" in the range of about 1 to about 3 atomic percent, can work well. In addition to high electrical resistivity and good corrosion resistance, this compound further possesses a soft magnetic property, with coercivity Hc about equal to zero (i.e., with hard axis coercivity Hch less than about 0.01 and easy axis coercivity Hce less than about 0.2).

Figure 8A:
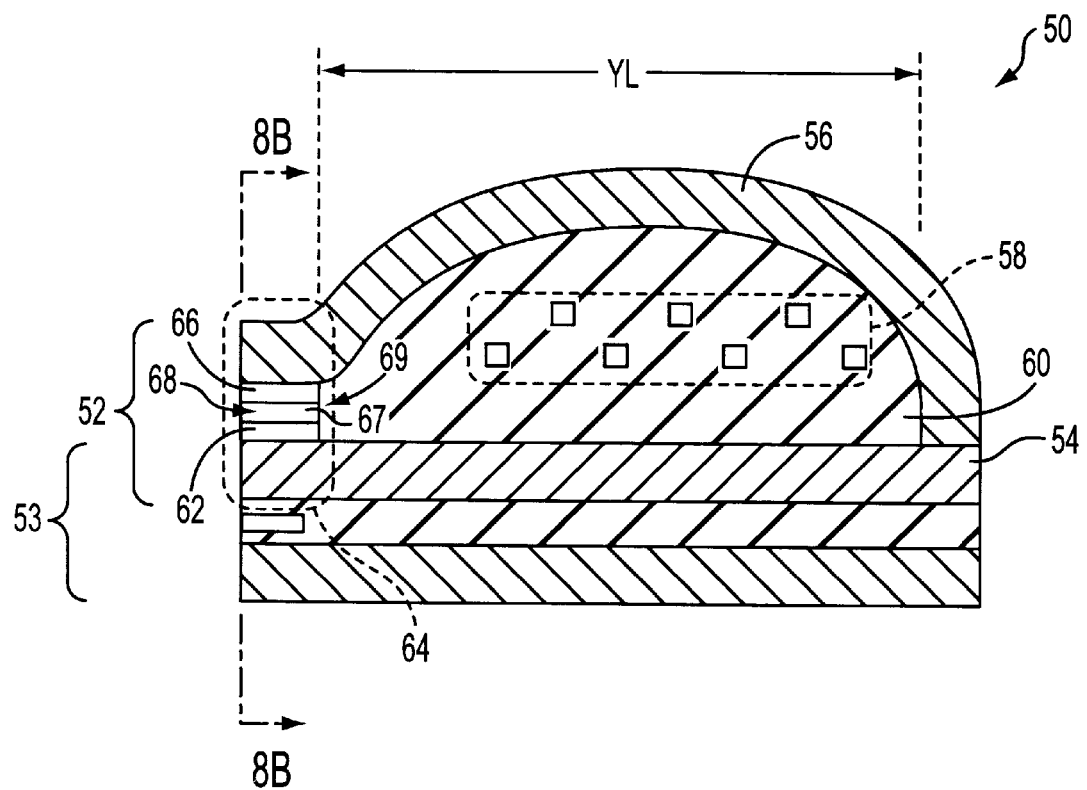
FIG. 8A is a cross-sectional view of a read/write head, according to an embodiment of the present invention.
Figure 8B:
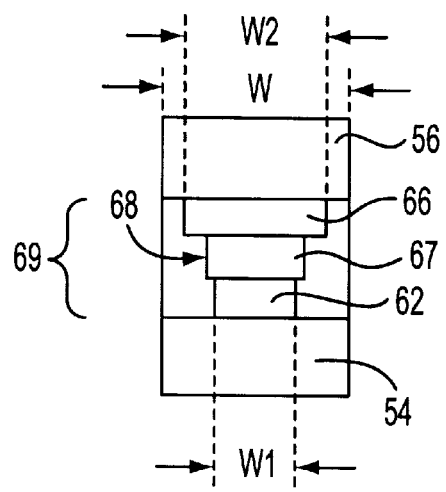
FIG. 8B is an end view of the read/write head of FIG. 8A taken along line 8B—8B of FIG. 8A.

A write element configuration according to another embodiment of the present invention is illustrated in FIGS. 8A and 8B. FIG. 8A shows a cross-sectional view of a read/write head 50 incorporating a write element 52 having a particular geometry, formed over a read element 53. The write element 50 includes a first pole 54, a second pole 56, and a conductive coil 58 that is embedded within a non-magnetic and electrically insulating material 60. In addition, the write element 50 incorporates a first yoke pedestal (Y1P) 62 adjacent to the first pole 54 in the yoke tip region 64. Further, a second yoke pedestal (Y2P) 66 is adjacent the second pole 56, also in the yoke tip region 64, and defines a write gap 68 between it and the first yoke pedestal 62. The write gap 68 is filled with non-magnetic material 67. Additionally, the Y1P 62, Y2P 66, and write gap 68 combine to form a tip stitch pole (TSP) 69. The particular geometry of the write element 52 can be more easily understood with reference to FIG. 8B.

FIG. 8B shows a partial end view of the write element 52 in the direction marked as 8B—8B in FIG. 8A. As can be seen from this view, the first yoke pedestal (Y1P) 62 is characterized by a first width W1, while the second yoke pedestal (Y2P) 66 is characterized by a second width W2. In the operation of such a write element, it is found that the trackwidth TW of the write element is substantially equal to the first width W1 of the first yoke pedestal, and thus is a first yoke pedestal defined (Y1P-defined) write element. Thus, a smaller trackwidth can be defined while the second width W2 of the second yoke pedestal Y2P can remain relatively similar to the width W of the second pole 56 to minimize flux leakage.

Figure 1A:
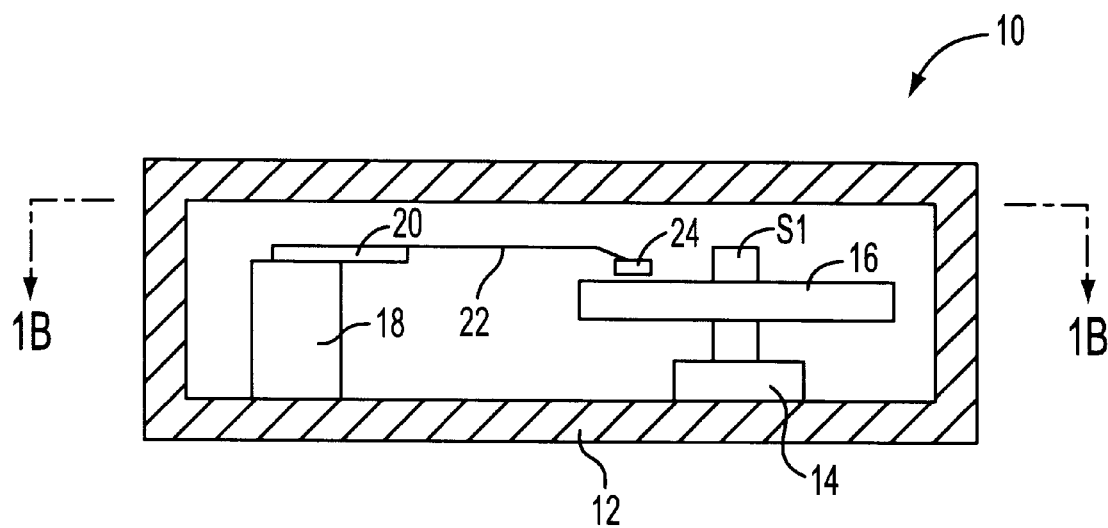
FIG. 1A is a partial cross-sectional front elevation view of a magnetic data storage system.
Figure 1B:
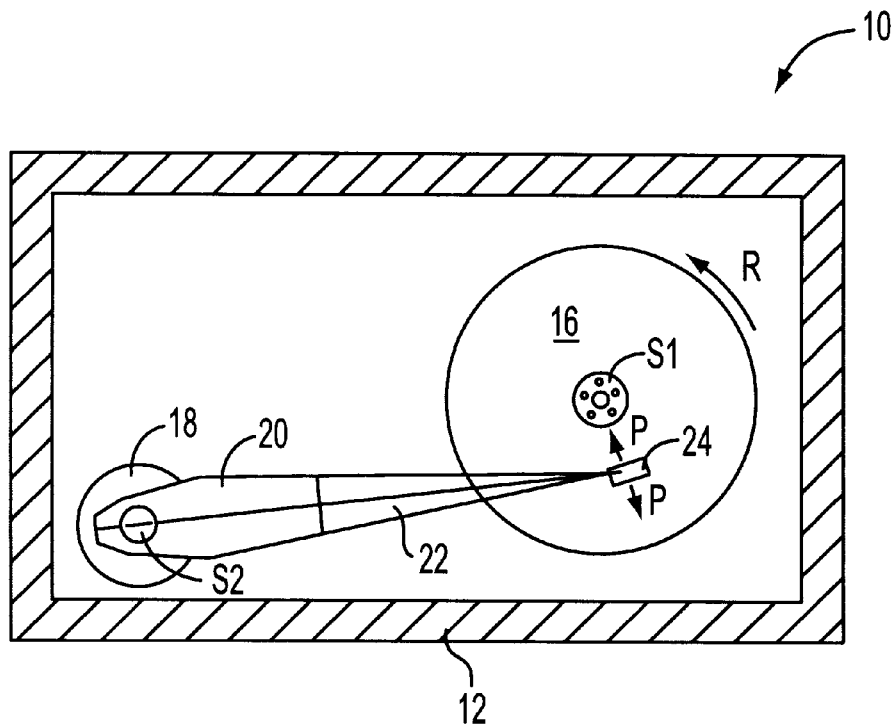
FIG. 1B is a top plan view along line 1B—1B of FIG. 1A.
Figure 1C:
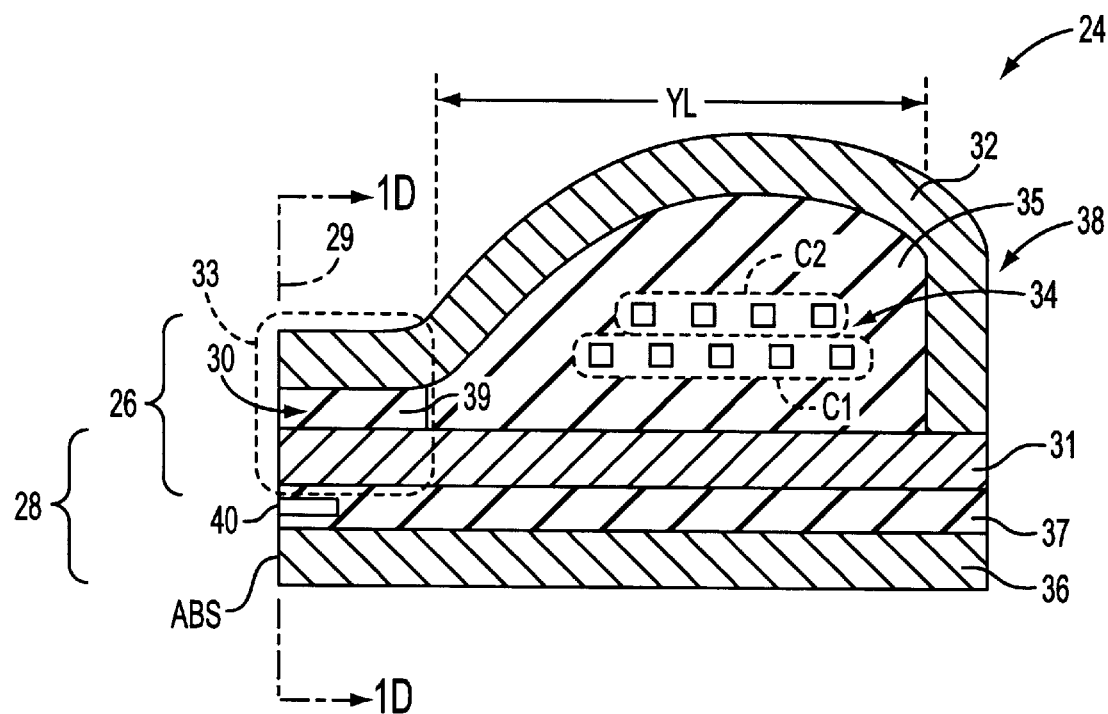
FIG. 1C is a cross-sectional view of a prior art read/write head of the magnetic disk drive assembly of FIGS. 1A and 1B.
Figure 1D:
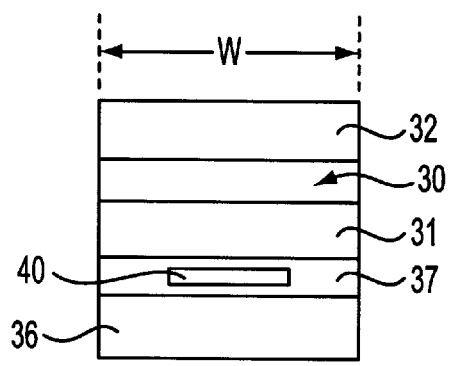
FIG. 1D is an end view taken along line 1D—1D of FIG. 1C, of a prior art write element of the read/write head of FIG. 1C.
Figure 1E:
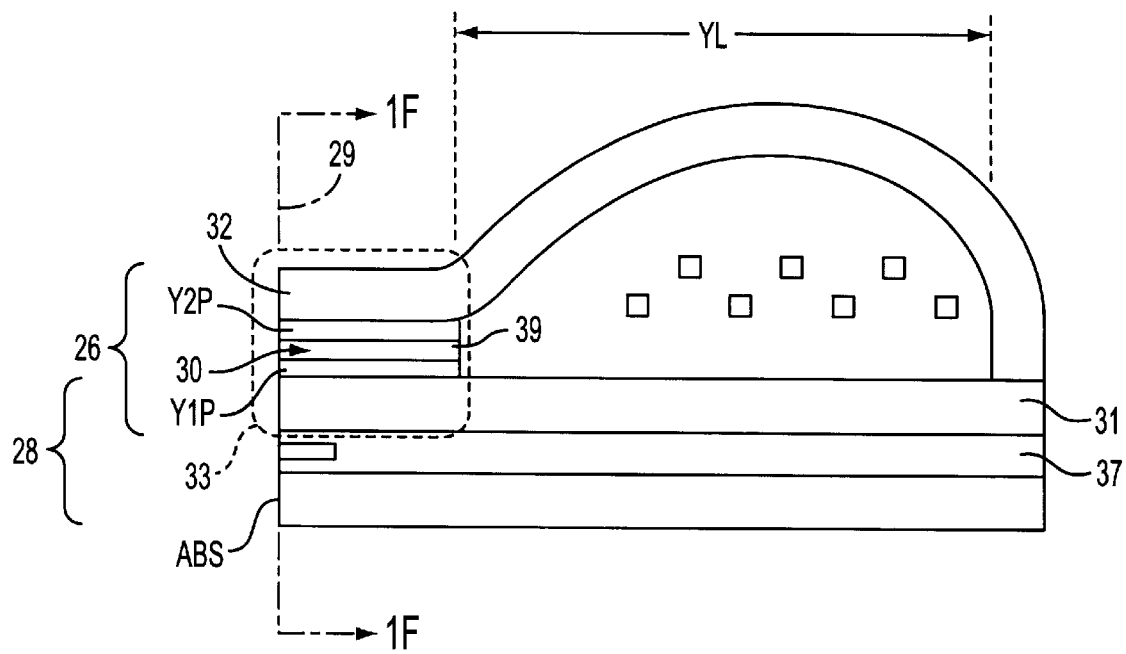
FIG. 1E is a cross-sectional view of another prior art read/write head of the magnetic disk drive assembly of FIGS. 1A and 1B.
Figure 1F:
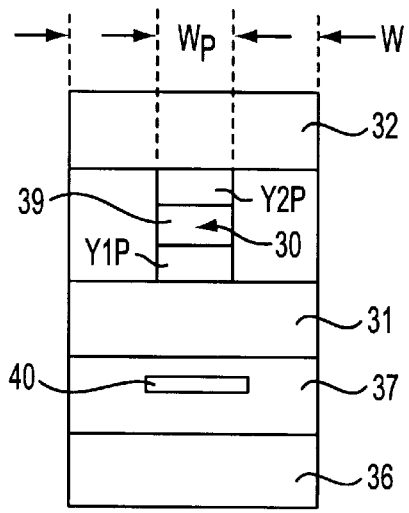
FIG. 1F is an end view taken along line 1F—1F of FIG. 1E, of a prior art write element of the read/write head of FIG. 1E.
Figure 2A:
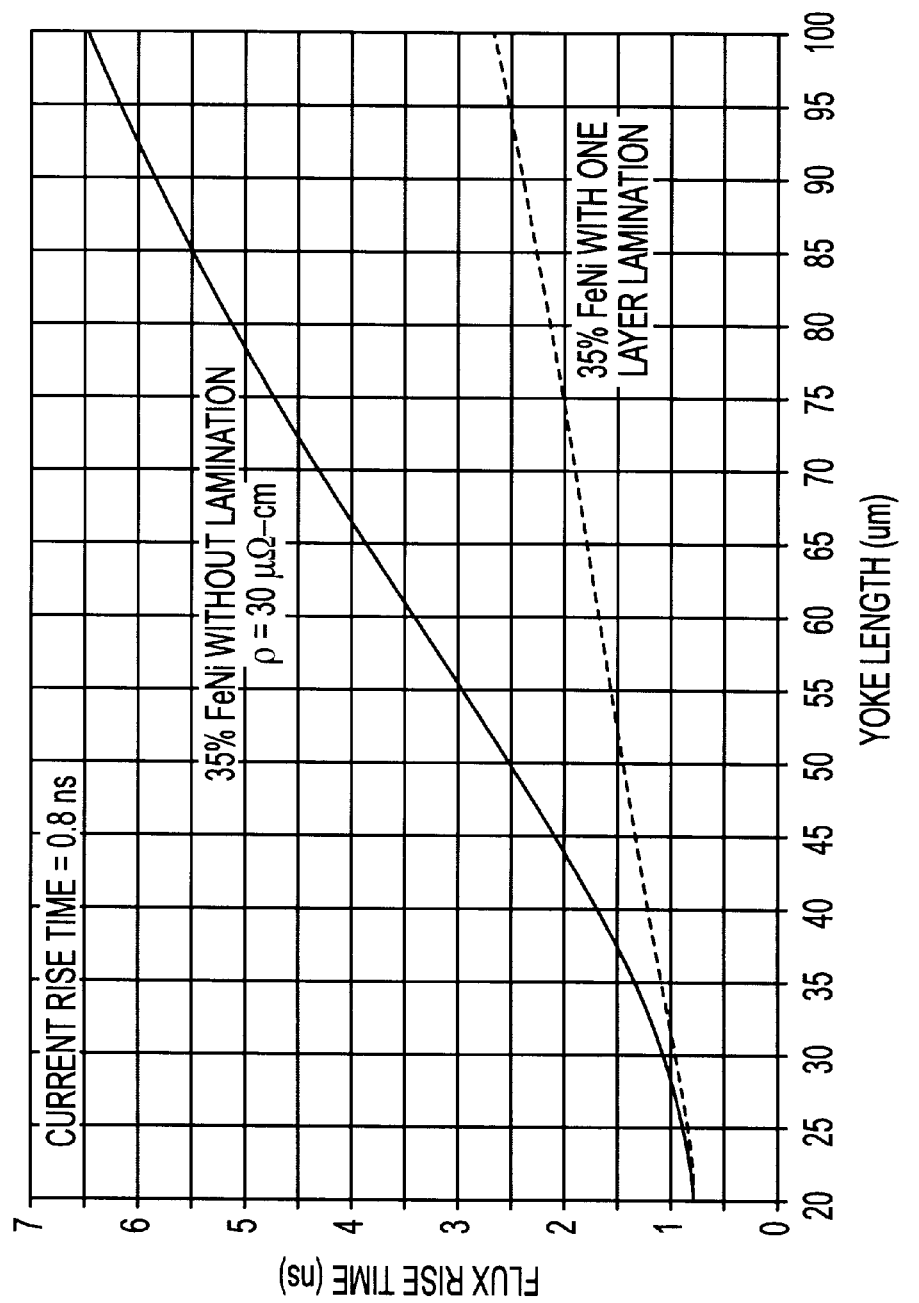
FIG. 2A is a graph of the variation of flux rise time exhibited by prior art write elements with varying yoke length.
Figure 2B:
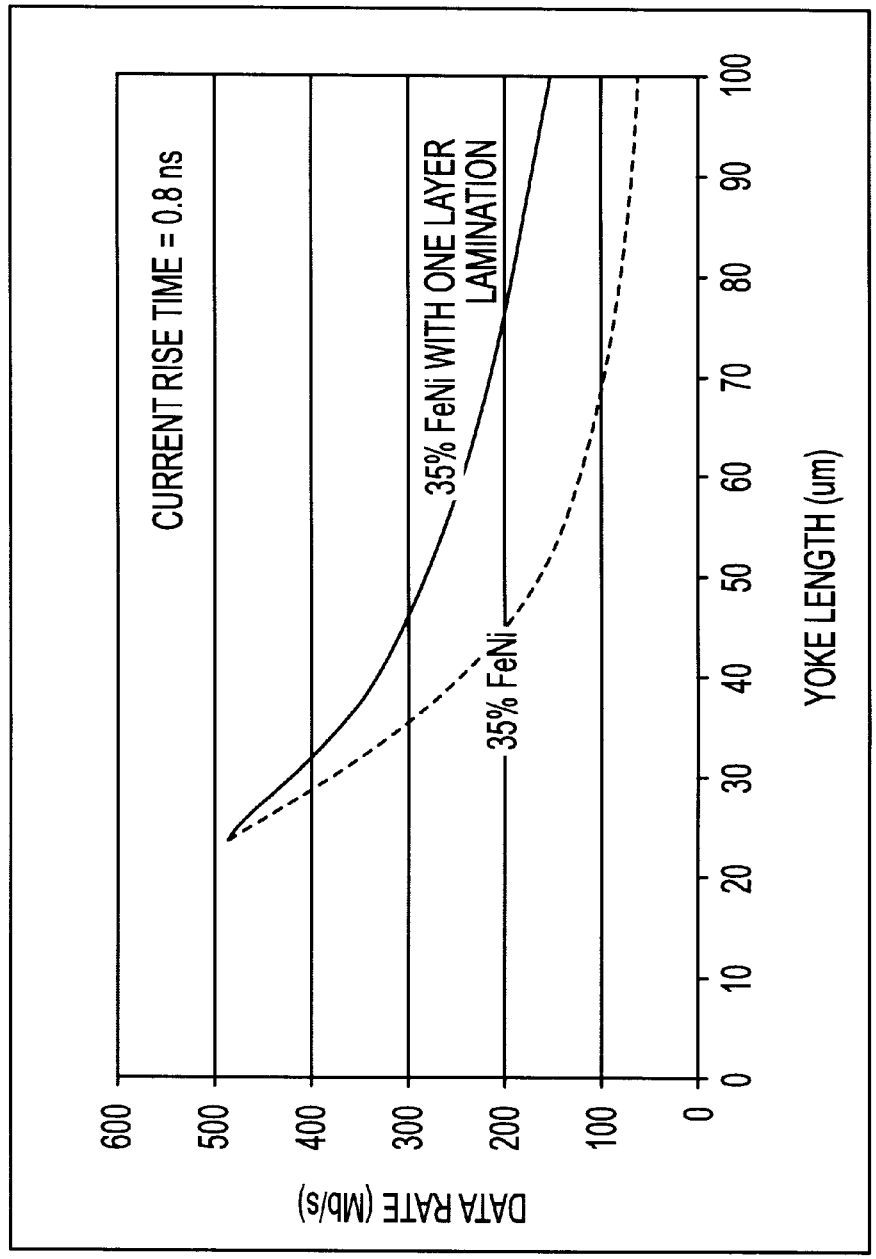
FIG. 2B is a graph of the variation of recorded data rate with varying yoke length, as exhibited with write elements of the prior art.
Figure 4A:
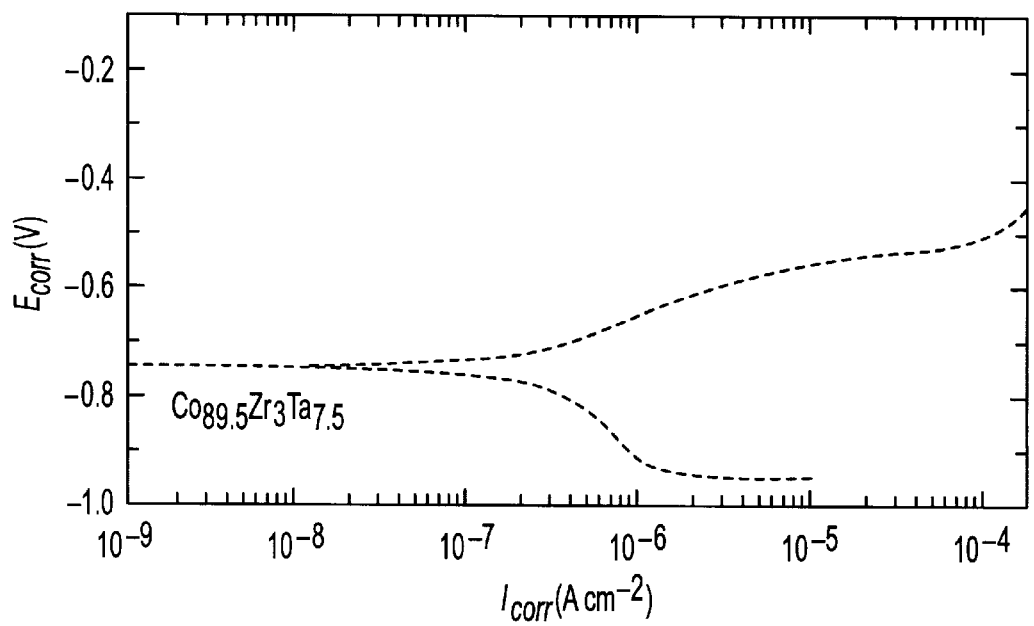
FIG. 4A is a graph illustrating the corrosion resistance of CoZrTa in NaCl electrolyte.
Figure 4B:
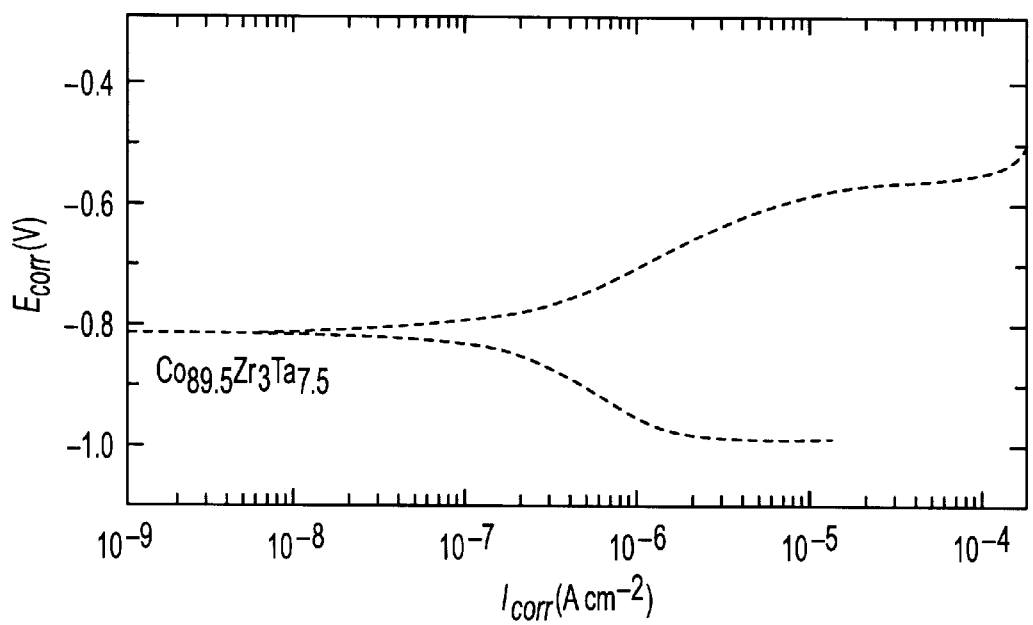
FIG. 4B is a graph illustrating the corrosion resistance of CoZrTa in $Na_2SO_4$ electrolyte.
Figure 9:
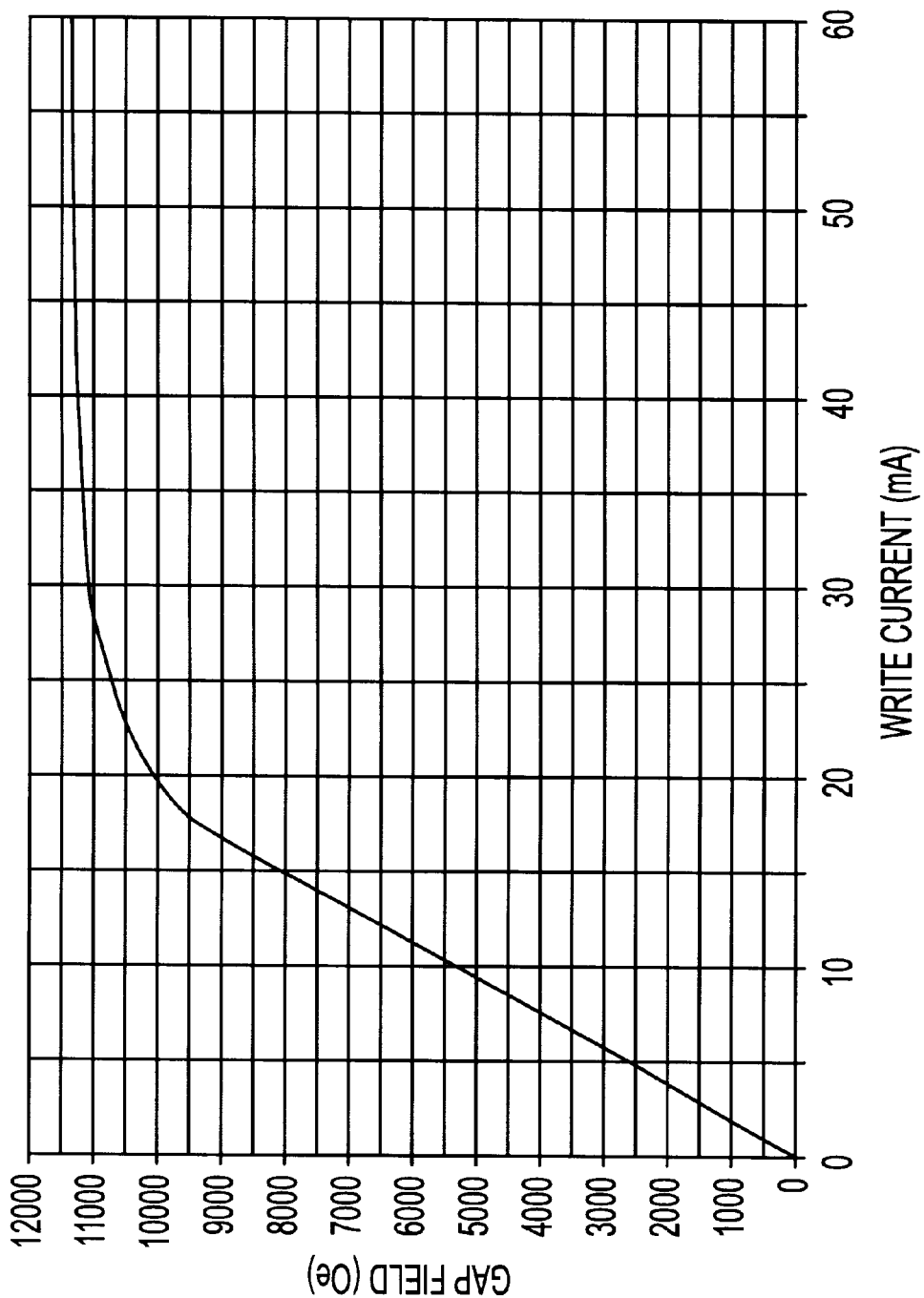
FIG. 9 is a graph of the gap field versus write current exhibited by the write element of FIGS. 8A and 8B, according to an embodiment of the present invention.
Figure 10:
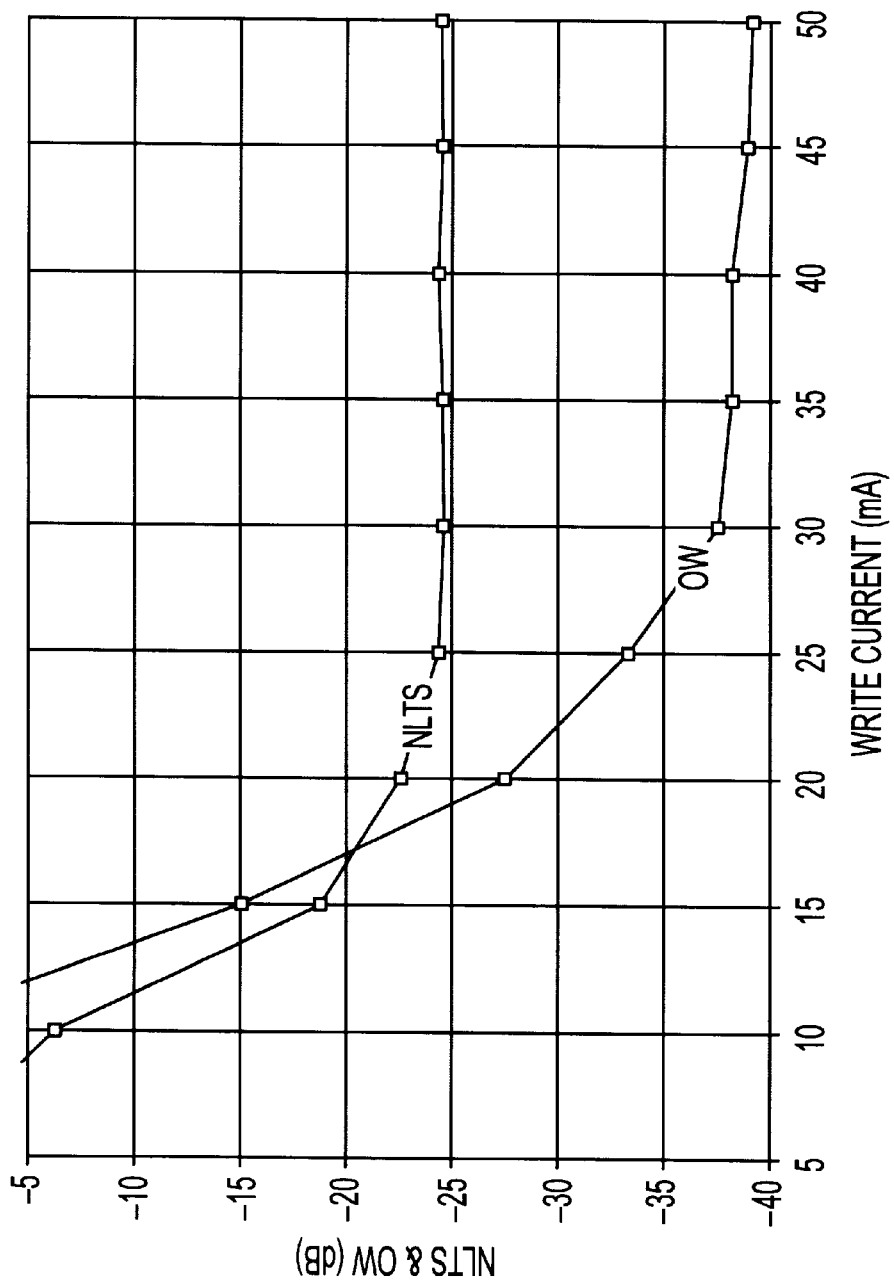
FIG. 10 is a graph of the NLTS and overwrite characteristics versus write current of the write element of FIGS. 8A and 8B, according to an embodiment of the present invention.

When this configuration is used in conjunction with a CoZrCr compound, the write element can produce a very large gap field, which is an important factor for high areal density applications in conjunction with high coercivity magnetic media, such as magnetic disk 16 of FIG. 1A. For example, FIG. 9 shows a graph of gap field versus write current for the $Co_{92.5}Zr_{5.2}Cr_{2.3}$ compound. In addition, the use of this compound with the particular write element geometry shown in FIGS. 8A and 8B, at a high data rate of 500 Mb/s, results in the write performance shown by the curves of FIG. 10. Specifically, the data of FIG. 10 pertains to a disk media having a high coercivity of about 4000 Oe and an Mrt of about 0.4 menu/cm². This performance indicates that this material is a good candidate for high areal density recording in conjunction with high coercivity magnetic media. Further, because of its other material properties, such a write head is also particularly well suited to high speed data recording.

Figure 11:
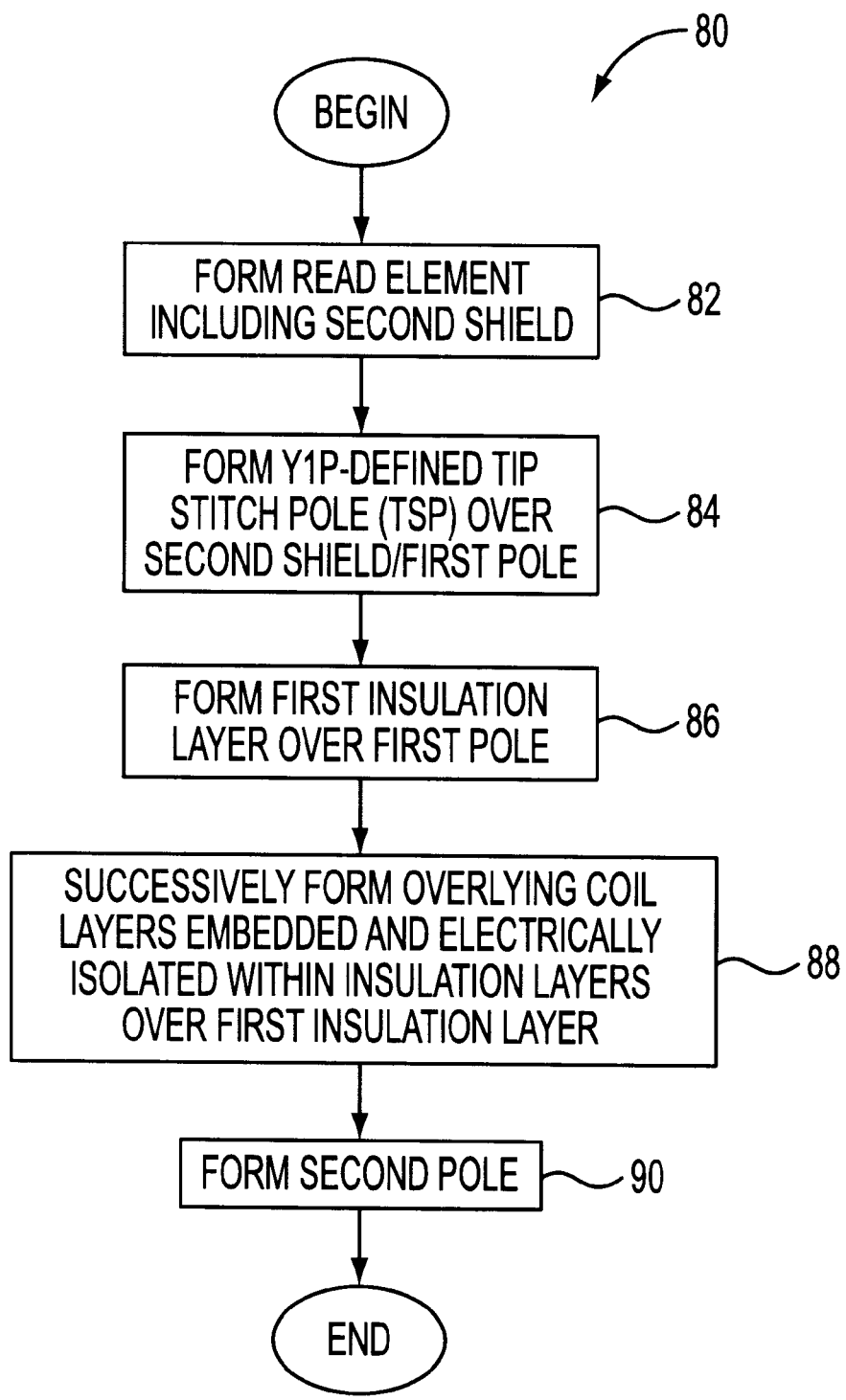
FIG. 11 is a process diagram of a method for forming a read/write head, according to an embodiment of the present invention.

A method 80 for forming a read/write element according to yet another embodiment of the present invention, is shown by the process diagram of FIG. 11. In operation 82, a read element including a second shield is formed. The read element further includes a first shield and a read sensor, each component of the read element being formed of various materials and by various methods known to those skilled in the art. In operation 84, a Y1P-defined tip stitch pole (TSP) is formed over the second shield which also performs as a first pole. The layers of the TSP can be formed using convention processes such as plating, sputtering, and various possible etching techniques. The formation of the Y1P-defined geometry is further discussed below with reference to FIG. 12.

A first insulation layer is also formed over the first pole in operation 86. This can be accomplished by sputter deposition of a non-magnetic and electrically insulating material over the first pole, and may further entail etching or planarizing of the non-magnetic and electrically insulating material. In operation 88, overlying coil layers embedded and electrically isolated within insulation layers are successively formed over the first insulation layer. A second pole is formed in operation 90 over the overlying coil layers and over the Y1P-defined tip stitch pole.

Figure 12:
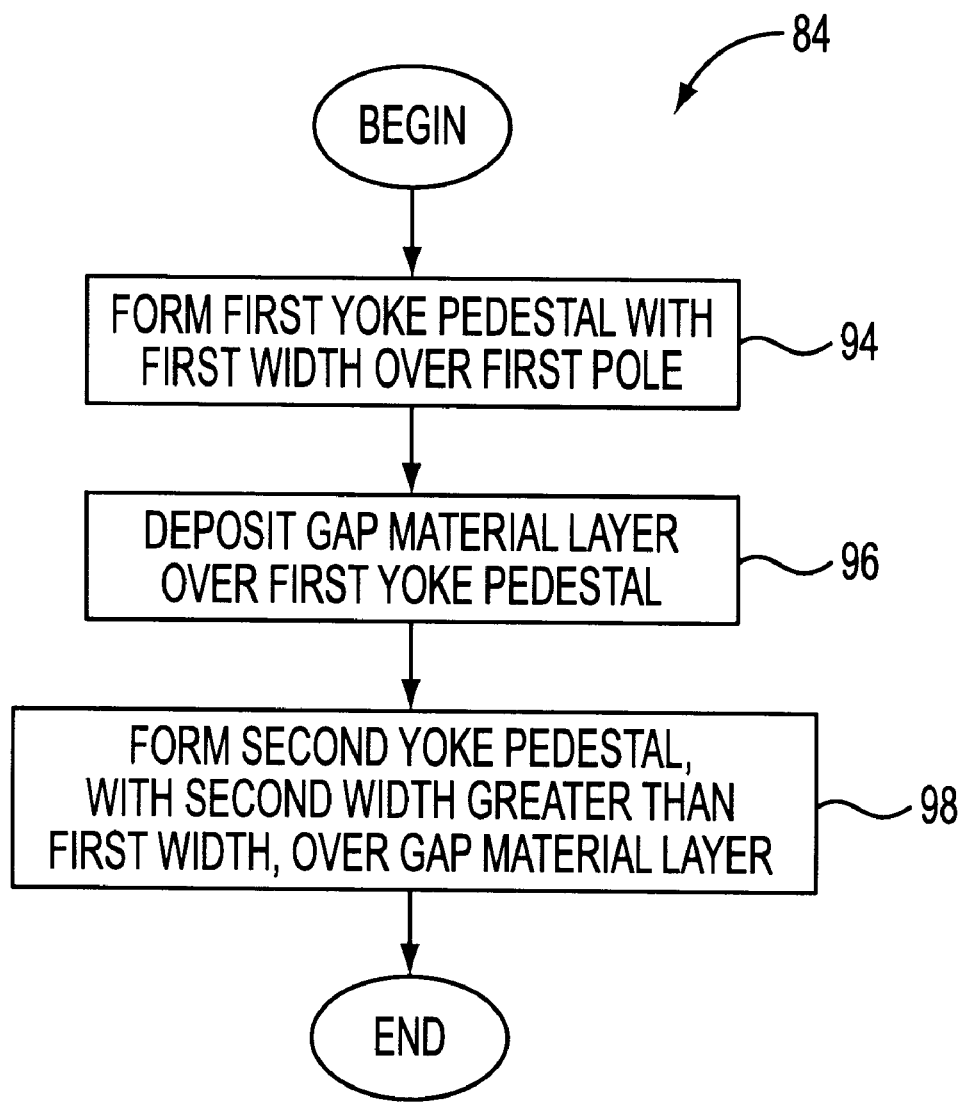
FIG. 12 is a process diagram of a method for forming a tip stitch pole in the method of FIG. 11, according to an embodiment of the present invention.

FIG. 12 further outlines operation 84 of FIG. 11. In operation 94 a first yoke pedestal (Y1P) is formed over the first pole, with a first width W1. The Y1P material can be made of the same material as used to form the first pole, such as Permalloy. A nonmagnetic gap material layer is deposited over the Y1P in operation 96. Operation 84 also includes the formation, in operation 98, of a second yoke pedestal over the gap material layer, with a second width W2 that is larger than the first width W1. Alternatively, the width W2 of the second yoke pedestal can be smaller than the width W1 of the first yoke pedestal.

Figure 13:
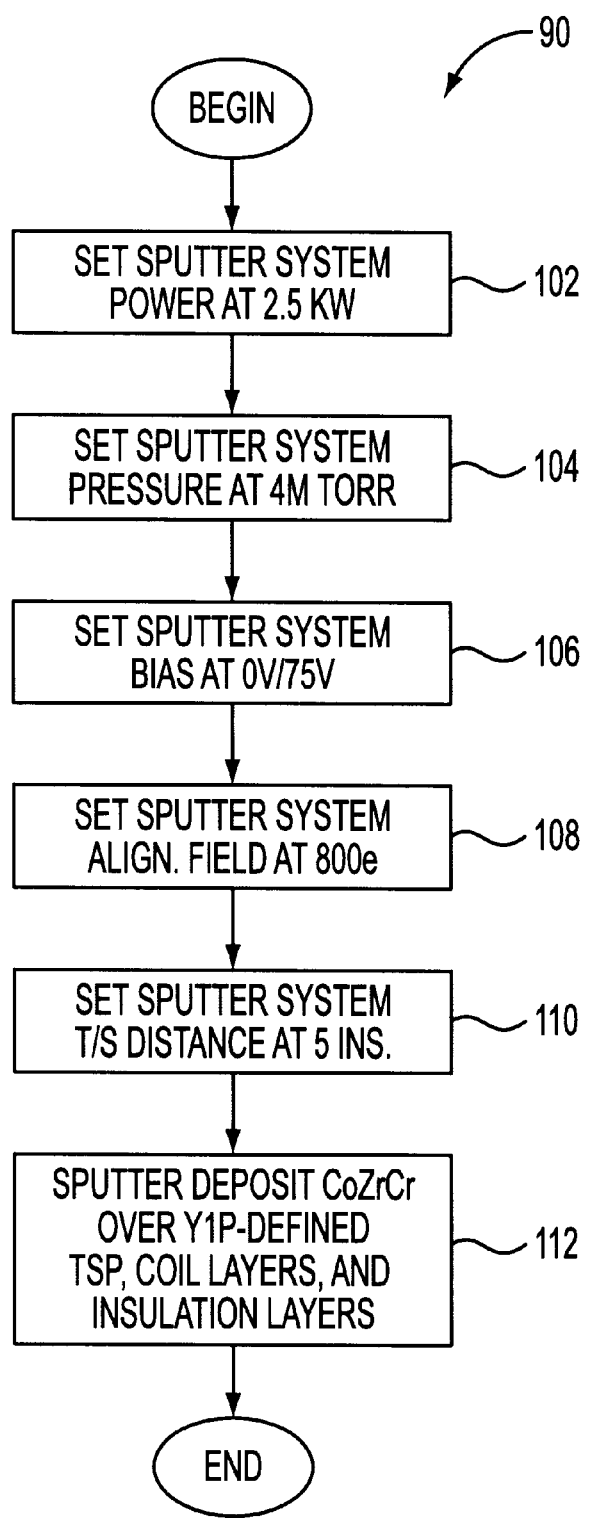
FIG. 13 is a process diagram of a method for forming a second pole in the method of FIG. 11, according to an embodiment of the present invention.

Operation 90 of the method in FIG. 11 is expanded upon in the process diagram of FIG. 13. Specifically, operation 90 pertains to formation of the second pole through DC magnetron sputtering of CoZrCr or other high Bs and high resistivity materials. In operation 102, the sputter deposition power is set at about 2.5 kW, while the gas (e.g., argon) pressure inside the deposition chamber is set at 4 mTorr in operation 104. Operation 106 includes setting the substrate bias at 0V/75V. The alignment field to obtain magnetic anisotropy in the deposition film is set at 80 Oe in operation 108, and the target to wafer distance is set at 5 inches. Under these conditions, CoZrCr is sputter deposited over the Y1P-defined tip stitch pole, coil layers, and insulation layers. With this deposition process, a $Co_{92.5}Zr_{5.2}Cr_{2.3}$ compound can be easily formed. This material then provides high areal density and high speed recording capability while resisting corrosion well.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A magnetic write element for use in high speed magnetic recording, comprising:
   a first pole having a first pole tip;
   a second pole having a second pole tip which defines a write gap with the first pole tip, said second pole being formed of a $Co_{100-a-b}Zr_aCr_b$ compound, where "a" is in the range of about 2 atomic percent to about 18 atomic percent, and "b" is in the range of about 0.5 atomic percent to about 6 atomic percent; and
   a conductive coil which lies between said first pole and said second pole.

2. The magnetic write element as recited in claim 1, further comprising:
   a first non-magnetic and electrically insulating material disposed within said write gap, and wherein said conductive coil is disposed within a second non-magnetic and electrically insulating material.

3. The magnetic write element as recited in claim 2, wherein said first non-magnetic and electrically insulating material and said second non-magnetic and electrically insulating material are the same material.

4. The magnetic write element as recited in claim 1, wherein said CoZrCr compound exhibits a resistivity of about 85 $\mu\Omega$-cm to about 100 $\mu\Omega$-cm and is corrosion resistant.

5. The magnetic write element as recited in claim 1, wherein "a" is in the range of about 4.5 atomic percent to about 9 atomic percent.

6. The magnetic write element as recited in claim 5, wherein "b" is in the range of about 1 atomic percent to about 3 atomic percent.

7. The magnetic write element as recited in claim 1, wherein said CoZrCr compound is about 92.5 atomic percent of Co, about 5.2 atomic percent of Zr, and about 2.3 atomic percent of Cr.

8. A magnetic device for high density magnetic recording, comprising:
   a first pole having a first pole tip portion;
   a first yoke pedestal, having a first width, connected to said first pole at said first pole tip portion;
   a second pole having a second pole tip portion and formed of a CoZrCr compound having a stoichiometric composition of $Co_{100-a-b}Zr_aCr_b$, where "a" is in the range of about 2 atomic percent to about 18 atomic percent, and "b" is in the range of about 0.5 atomic percent to about 6 atomic percent;
   a second yoke pedestal connected to said second pole at said second pole tip portion and aligned with said first yoke pedestal, said second yoke pedestal having a second width that is different than said first width, wherein a write gap is formed between said first yoke pedestal and said second yoke pedestal; and
   a conductive coil positioned between said first pole and said second pole.

9. The magnetic device as recited in claim 8, wherein said first width is larger than said second width.

10. The magnetic device as recited in claim 8, wherein said first width is smaller than said second width.

11. The magnetic device as recited in claim 8, wherein said first yoke pedestal is integral with said first pole, and said second yoke pedestal is integral with said second pole.

12. The magnetic device as recited in claim 8, wherein the first width is in the range of about 0.2 $\mu$m to about 1.2 $\mu$m.

13. The magnetic device as recited in claim 12, wherein the second width is in the range of about 0.5 $\mu$m to about 2.0 $\mu$m.

14. The magnetic device as recited in claim 8, wherein a difference between said first width and said second width is in the range of about 0.1 µm to about 1.0 µm.

15. The magnetic device as recited in claim 8, wherein "a" is in the range of about 4 atomic percent to about 9 atomic percent, and "b" is in the range of about 1 atomic percent to about 3 atomic percent.

16. The magnetic device as recited in claim 8, wherein said CoZrCr compound is formed of about 92 atomic percent of Co, about 5.2 atomic percent of Zr, and about 2 atomic percent of Cr.

17. The magnetic device as recited in claim 8, further comprising:

a read element including:

a first shield; and a magnetoresistive sensor between said first shield and said first pole, said first pole also forming a second shield of said read element.

18. The magnetic device as recited in claim 17, wherein said write element and said read element form a read/write head, said magnetic device further comprising:

a read/write head suspension system for facilitating placement of said read/write head in proximity to a magnetic medium; and a medium support for supporting said magnetic medium.

* * * * *